United States Patent
Oesterreicher

(10) Patent No.: US 11,356,493 B2
(45) Date of Patent: Jun. 7, 2022

(54) SYSTEMS AND METHODS FOR CLOUD STORAGE DIRECT STREAMING

(71) Applicant: Streaming Global, Inc., Alpharetta, GA (US)

(72) Inventor: Richard Oesterreicher, Johns Creek, GA (US)

(73) Assignee: Streaming Global, Inc., Alpharetta, GA (US)

(*) Notice: Subject to any disclaimer, the term of this patent is extended or adjusted under 35 U.S.C. 154(b) by 0 days.

(21) Appl. No.: 17/134,420

(22) Filed: Dec. 27, 2020

(65) Prior Publication Data

US 2021/0120064 A1 Apr. 22, 2021

Related U.S. Application Data

(63) Continuation of application No. 16/159,595, filed on Oct. 12, 2018, now Pat. No. 10,880,353.

(Continued)

(51) Int. Cl.
*H04L 65/60* (2022.01)
*H04N 21/222* (2011.01)
(Continued)

(52) U.S. Cl.
CPC .......... *H04L 65/607* (2013.01); *H04L 65/602* (2013.01); *H04L 65/80* (2013.01);
(Continued)

(58) Field of Classification Search
CPC ..... H04L 63/00; H04L 65/602; H04L 65/207; H04L 65/80; H04L 67/10; H04L 67/1097;
(Continued)

(56) References Cited

U.S. PATENT DOCUMENTS

| 7,675,514 B2 | 3/2010 | Ni et al. |
| 7,770,004 B2 * | 8/2010 | Herf .................... H04N 1/33315 713/162 |

(Continued)

FOREIGN PATENT DOCUMENTS

| WO | 2015106635 A1 | 7/2015 |
| WO | 2019028393 A1 | 2/2019 |
| WO | 2019075428 A1 | 4/2019 |

OTHER PUBLICATIONS

International Search Report and Written Opinion dated Oct. 15, 2018 cited in Application No. PCT/US18/45216, 9 pgs.

(Continued)

*Primary Examiner* — David P Zarka
(74) *Attorney, Agent, or Firm* — Bekiares Eliezer LLP

(57) ABSTRACT

Embodiments of the present disclosure may provide a system comprising a client source device, a server, and a client viewing device. The client source device may be configured to: encode content as a plurality of fragments of at least one quality parameter, send each encoded fragment to a cloud storage, generate metadata associated with each encoded fragment, and provide the generated metadata associated with each encoded fragment. The server may be configured to: receive each encoded fragment, store each encoded fragment into the cloud storage for retrieval, and facilitate an authentication for access to the metadata associated with each encoded fragment. A client viewing device configured to request the authentication for access to the metadata, receive the metadata, determine a desired fragment of the plurality of fragments encoded in a desired quality parameter, and retrieve the desired fragment in the desired quality parameter.

12 Claims, 6 Drawing Sheets

Related U.S. Application Data

(60) Provisional application No. 62/571,366, filed on Oct. 12, 2017.

(51) Int. Cl.

| | | |
|---|---|---|
| *H04L 65/80* | (2022.01) | |
| *H04N 21/845* | (2011.01) | |
| *H04N 21/2187* | (2011.01) | |
| *H04N 21/2343* | (2011.01) | |
| *H04N 21/2743* | (2011.01) | |
| *H04L 67/1097* | (2022.01) | |
| *H04L 67/10* | (2022.01) | |
| *H04L 9/40* | (2022.01) | |

(52) U.S. Cl.
CPC ..... *H04L 67/1097* (2013.01); *H04N 21/2187* (2013.01); *H04N 21/2223* (2013.01); *H04N 21/23439* (2013.01); *H04N 21/2743* (2013.01); *H04N 21/8456* (2013.01); *H04L 63/00* (2013.01); *H04L 67/10* (2013.01)

(58) Field of Classification Search
CPC ........... H04N 21/2187; H04N 21/2223; H04N 21/23439; H04N 21/2743; H04N 21/8456
USPC ....................................................... 709/203
See application file for complete search history.

(56) References Cited

U.S. PATENT DOCUMENTS

| | | | |
|---|---|---|---|
| 8,042,142 | B1 | 10/2011 | Doshi et al. |
| 8,065,628 | B2 | 11/2011 | Oshiro et al. |
| 8,184,169 | B2 | 5/2012 | Ortiz |
| 8,219,930 | B2 | 7/2012 | Johns |
| 8,327,278 | B2 | 12/2012 | Knight et al. |
| 8,458,613 | B2 | 6/2013 | Oshiro et al. |
| 8,683,067 | B2 | 3/2014 | Herz |
| 8,874,538 | B2 | 10/2014 | Mate et al. |
| 8,887,088 | B2 | 11/2014 | Oshiro et al. |
| 8,942,536 | B2 | 1/2015 | Herz |
| 8,990,728 | B2 | 3/2015 | Oshiro et al. |
| 9,020,832 | B2 | 4/2015 | Fisher et al. |
| 9,026,596 | B2 | 5/2015 | Perez et al. |
| 9,183,560 | B2 | 11/2015 | Abelow |
| 9,235,765 | B2 | 1/2016 | Bentley et al. |
| 9,509,968 | B2 | 11/2016 | Zimmermann et al. |
| 10,482,135 | B2 | 11/2019 | Rychikhin |
| 10,491,665 | B2 | 11/2019 | Gouge et al. |
| 10,880,353 | B2 | 12/2020 | Oesterreicher |
| 2002/0047895 | A1 | 4/2002 | Bernardo et al. |
| 2002/0164008 | A1* | 11/2002 | Kotik .................. H04Q 3/0016 379/219 |
| 2003/0191745 | A1 | 10/2003 | Jiang et al. |
| 2004/0153951 | A1 | 8/2004 | Walker et al. |
| 2006/0212833 | A1 | 9/2006 | Gallagher et al. |
| 2009/0148124 | A1 | 6/2009 | Athsani et al. |
| 2010/0061446 | A1 | 3/2010 | Hands et al. |
| 2010/0118697 | A1 | 5/2010 | Shumate |
| 2010/0146055 | A1 | 6/2010 | Hannuksela |
| 2011/0286545 | A1 | 11/2011 | Guignard et al. |
| 2012/0002717 | A1 | 1/2012 | Ma et al. |
| 2012/0102154 | A1 | 4/2012 | Huang et al. |
| 2012/0198335 | A1 | 8/2012 | Huang |
| 2012/0200707 | A1 | 8/2012 | Stein et al. |
| 2014/0161050 | A1 | 6/2014 | Grinshpun et al. |
| 2014/0240319 | A1* | 8/2014 | Syed ................ H04N 21/23439 345/428 |
| 2014/0292746 | A1 | 10/2014 | Acharya et al. |
| 2014/0294361 | A1 | 10/2014 | Acharya et al. |
| 2014/0304225 | A1 | 10/2014 | Suresh et al. |
| 2014/0359154 | A1 | 12/2014 | Tripathy |
| 2015/0026747 | A1 | 1/2015 | Au et al. |
| 2015/0052236 | A1 | 2/2015 | Friedrich et al. |
| 2015/0128174 | A1 | 5/2015 | Rango et al. |
| 2015/0146778 | A1* | 5/2015 | De Cicco ........... H04N 21/8456 375/240.07 |
| 2015/0281746 | A1 | 10/2015 | Lam |
| 2015/0296224 | A1 | 10/2015 | Davis |
| 2015/0350704 | A1* | 12/2015 | Horen ................ H04L 67/2842 725/95 |
| 2016/0029088 | A1 | 1/2016 | Hutten |
| 2016/0035224 | A1 | 2/2016 | Yang et al. |
| 2016/0071325 | A1 | 3/2016 | Callaghan |
| 2016/0088322 | A1 | 3/2016 | Horev et al. |
| 2016/0180883 | A1 | 6/2016 | Hamer |
| 2016/0217325 | A1 | 7/2016 | Bose et al. |
| 2016/0286244 | A1 | 9/2016 | Chang et al. |
| 2017/0111413 | A1 | 4/2017 | Nowak |
| 2017/0272393 | A1 | 9/2017 | Nimushakavi |
| 2018/0199080 | A1 | 7/2018 | Jackson, Jr. et al. |
| 2019/0042868 | A1 | 2/2019 | Oesterreicher et al. |
| 2019/0044988 | A1 | 2/2019 | Oesterreicher et al. |
| 2019/0116215 | A1 | 4/2019 | Oesterreicher |
| 2019/0213709 | A1 | 7/2019 | Meek et al. |

OTHER PUBLICATIONS

International Search Report and Written Opinion dated Oct. 16, 2018 cited in Application No. PCT/US18/045226, 9 pgs.
U.S. Non-Final Office Action dated Feb. 26, 2019 cited in U.S. Appl. No. 15/668,510, 7 pgs.
International Search Report and Written Opinion dated Mar. 7, 2019 cited in Application No. PCT/US18/55744, 7 pgs.

* cited by examiner

SYSTEMS AND METHODS FOR CLOUD STORAGE DIRECT STREAMING

RELATED APPLICATIONS

This application is a continuation of U.S. application Ser. No. 16/159,595 filed on Oct. 12, 2018, which issues on Dec. 29, 2020 as U.S. Pat. No. 10,880,353, which claims the benefit of priority to U.S. Provisional Application No. 62/571,366 filed on Oct. 12, 2017, which are incorporated herein by reference in its entirety.

It is intended that the above-referenced application may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to content streaming. More specifically, the present disclosure relates to improving efficiency in content streaming.

BACKGROUND

Viewing content such as movies, TV shows, music, and live streams from a broadcaster, streaming service, game, or a smart mobile device, over the internet, known as streaming, has rapidly gained popularity. In fact, streaming services now account for more than 70% of Internet traffic, and that percentage is still growing.

The architecture commonly used by streaming providers is based on the same client-server model that made the World Wide Web possible. It is a model where the server centralizes the processing of information consumed and displayed by the client devices. This general-purpose computer science architecture has been useful and flexible during the formative years of streaming. As is the case with other Internet-based services, the server becomes the point of failure when resources are overloaded trying to service too many users. That architectural problem is usually solved with the simple and costly option of replicating more and more servers, known as scaling.

With streaming video and audio traffic still growing, the inefficiencies of a traditional client-server model combined with server-replication scaling, is leading to wasted computing resources and less than optimal streaming performance for end-users.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

BRIEF OVERVIEW

Figure 1:
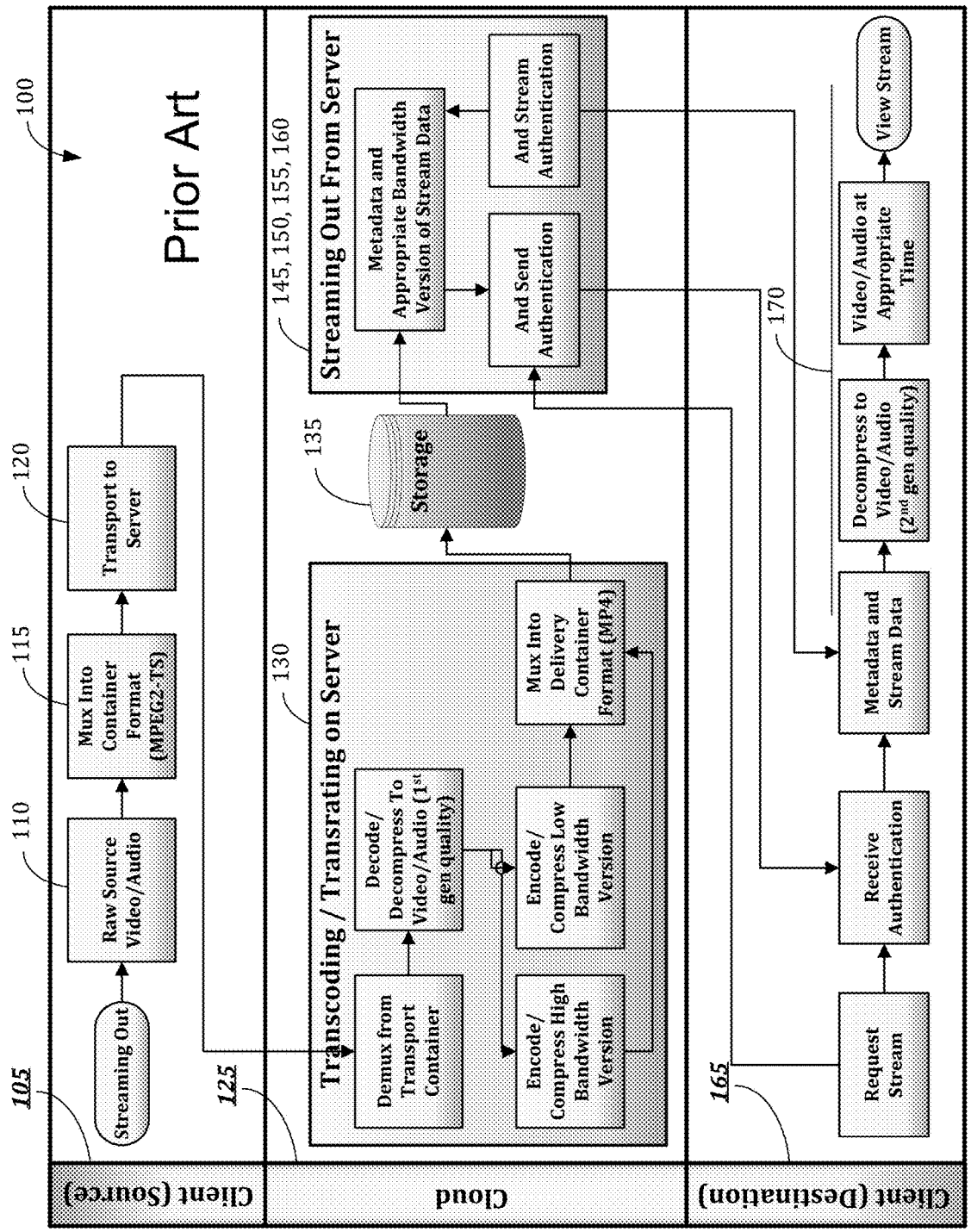
FIG. 1 is a flow chart depicting conventional content streaming architecture.

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Embodiments of the present disclosure may provide a system comprising a client source device, a server, and a client viewing device. The client source device may be configured to: encode content as a plurality of fragments of at least one quality parameter, send each encoded fragment to a cloud storage, generate metadata associated with each encoded fragment, and provide the generated metadata associated with each encoded fragment. The server may be configured to: receive each encoded fragment, store each encoded fragment into the cloud storage for retrieval, and facilitate an authentication for access to the metadata associated with each encoded fragment. A client viewing device configured to request the authentication for access to the metadata, receive the metadata, determine a desired fragment of the plurality of fragments encoded in a desired quality parameter, and retrieve the desired fragment in the desired quality parameter.

Embodiments of the present disclosure may further provide a client source device configured to write each encoded fragment, in substantially real-time as it is encoded, directly to the cloud storage.

Embodiments of the present disclosure may further provide a client source device configured to provide the metadata, as it is generated, for each encoded fragment, in substantially real-time as each corresponding encoded fragment is written directly to the cloud storage.

Embodiments of the present disclosure may further provide a server further configured to facilitate, upon authentication, a real-time messaging channel between the client source device and the client viewing device.

Embodiments of the present disclosure may further provide a client source device configured to provide the metadata through the real-time messaging channel, in substantial real-time as it is generated.

Embodiments of the present disclosure may further provide a client viewing device configured to receive the metadata through the real-time messaging channel, in substantial real-time as it is provided by the client source device.

Embodiments of the present disclosure may further provide a client source device configured to write the metadata to a cloud table storage.

Embodiments of the present disclosure may further provide a client viewing device configured to retrieve the metadata from the cloud table storage.

Embodiments of the present disclosure may further provide that a client viewing device further determines the desired fragment, with the desired quality parameter, based on, at least in part, a parameter associated with the client viewing device.

Embodiments of the present disclosure may further provide a system wherein the server does not determine which encoded fragment of the plurality of encoded fragments stored in cloud storage to send to the client viewing device.

Embodiments of the present disclosure may further provide a system wherein the server does not generate the metadata for the encoded plurality of fragments.

Embodiments of the present disclosure may further provide a system wherein the server does not transcode any of the plurality of encoded fragments prior to facilitating a retrieval of the plurality of encoded fragments.

Embodiments of the present disclosure may further provide a system wherein the client source device is associated with at least one content capturing device.

Embodiments of the present disclosure may further provide a source device configured to encode the content as the plurality of fragments and send each encoded fragment to the cloud storage in substantial real-time as the content is captured by the at least one content capturing device.

Embodiments of the present disclosure may further provide a system wherein the server is configured to store a first set of encoded fragments that is associated with a first content, and a second set of encoded fragments that is associated with a second content.

Embodiments of the present disclosure may further provide a client viewing device configured to retrieve and stitch a first fragment associated with the first content and a second fragment associated with the second content.

Embodiments of the present disclosure may further provide a client viewing device configured to retrieve and stitch the second fragment associated with the second content with the first fragment associated with the second content based on, at least in part, instructions received from a real-time messaging channel established with the client viewing device through the server.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

DETAILED DESCRIPTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of the example embodiments, additional embodiments of the present disclosure are not limited to use only in this context. For example, in addition to content streaming utility, the various embodiments of the present disclosure may be applicable to data streaming, in general. Embodiments of the present disclosure may improve data streaming for data flowing from a source to a destination in a low latency, synchronous, and efficient matter.

I. Brief Introduction and Overview of Advantages

This brief overview is provided to introduce a selection of concepts in a simplified form that are further described below. This brief overview is not intended to identify key features or essential features of the claimed subject matter. Nor is this brief overview intended to be used to limit the claimed subject matter's scope.

Methods and systems consistent with embodiments of the present disclosure may improve upon conventional methods and systems for delivering content from an origin source (referred to herein as a "source device," specifically, or a "client device," generally) to supported destination devices (referred to herein as a "viewer device," specifically, or a "client device," generally). Such methods and systems may employ a cloud server via the internet, usually in a specific transport format and networking protocol.

In conventional systems, the cloud server may be configured to transcode the content received from source device into an acceptable format for supported viewer devices. Typically, the content may be transcoded into at least two acceptable bitrates for the multiple bandwidth quality options that a viewer device may request. Accordingly, in conventional solutions, content received from a source may be transcoded by a cloud server, persist in an associated cloud storage, and delivered to the viewer device from the cloud computing environment.

In embodiments where content is streamed as it is generated (referred to herein as "live streaming"), conventional methods and systems may modify the aforementioned process by employing the cloud computing environment to send transcoded content directly to viewer devices as soon as it is transcoded, at frequent intervals. Accordingly, a difference between conventional streaming (e.g., on-demand content streaming) and conventional live-streaming, both of which use transcoding, is that with on-demand content streaming, the transcoded content is stored until a viewer requests it, and with live streaming, the transcoded content is immediately (relatively) sent out to any connected viewer device requesting the content.

Embodiments of the present disclosure may be configured to bypass/replace transcoding altogether, thereby improving upon the conventional methods and systems as detailed herein. Such reconfiguration takes advantage of improvements to client device technologies made since the advent of the cloud-based streaming methods and systems. For instance, client devices have become much more powerful than they were when the client-server model was designed. By taking advantage of the computing power in modern client devices, as both source and viewing devices, much of the work traditionally performed by the server can be distributed to the clients. This includes, for example, the operation of encoding content on a client device. Whereas, at the time of the client-server model's design, client devices weren't as adapted to multiple encoding operations contemptuously with the generation and delivery of content, improvements to the client device technology have now made these operations feasible on the client device itself. This technical improvement enables a departure from the general-purpose client-server model, to a more application specific distribution of work.

As such, embodiments of the present disclosure provide systems and methods for streaming designed to require less cloud-based resources. Some of the advantages may include, for example, a reduced cost associated with operating a streaming service at scale.

Some of the benefits of the systems and methods disclosed herein may include, but not be limited to, for example:
  Lower operating cost, at any scale
  Lesser end to end (E2E) latency with live streams
  Lesser time to first frame (TTFF) with live and VOD streams
  Improved visual quality (zero transcoding required)
  Improved content protection (always fragmented)

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described herein.

II. Description of Conventional Methods

FIG. 1 illustrates a conventional cloud-based streaming architecture. The illustration is provided as an abstraction of conventional streaming architecture to provide the context in which to present and assess the benefits of the improvements to conventional architecture presented herein. As such, the illustration and accompanying description is not intended to fully disclose or enable the conventional architecture.

It has become common to refer to devices and services available via the Internet as the "cloud." It should be understood that all servers are assumed to be computing devices remotely connected via the internet (or other telecommunications network) and will simply be called servers or cloud servers throughout the present disclosure. Such servers may be embodied as, for example, but not limited to, computing device 600 disclosed with reference to FIG. 6 below. Furthermore, remotely-accessible storage mediums referred to herein may be referred to generally as "cloud storage." It should be understood that such terms are used broadly to illustrate the concepts disclosed herein.

FIG. 1 shows a flow chart setting forth the general stages involved in a conventional streaming architecture. Embodiments of the present disclosure may provide streaming that consists of stages performed on a streaming source device, a server device, and a viewing device (each of which may be described as a computing device 600 with reference to FIG. 6). Although method 100 has been described to be performed by specific computing elements (e.g., source device, server device, viewer device), it should be understood that computing device 600 may be used to perform the various stages of method 100. Furthermore, in some embodiments, different operations may be performed by different networked elements in operative communication with computing device 600. As such, method 100 may be implemented using one or more computing devices, such as, but not limited to, computing device 600 as described in more detail below with respect to FIG. 6.

Furthermore, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. The stages of a method 100 may comprise, but not be limited to, the following.

STAGE 105: Client Source (Origin) Device Operations

Method 100 may begin at stage 105, step 110, with source encoding. Source encoding may comprise, for example, the initial compression of the video and/or audio source, and formatting (mux) into a transport container format on the origin device. The container format may be, for example, in an MPEG2-TS format.

Method 100 may then proceed to stage 105, step 115, by adding metadata to describe the encoded stream. Metadata may comprise, but not be limited to, for example, a name, duration, size, bit-rate, encoding, creation time, location, and presentation time of video frame and/or audio sample.

Method 100 may then proceed to stage 105, step 120, by transporting the encoded stream and metadata from the origin device to a server over a network. For example, the client source device may be configured to stream to a cloud server over the Internet.

STAGE 125: Cloud Server Operations

Method 100 may then proceed to stage 125, step 130, wherein a cloud-based server may transcode the content stream received from the source device. The stage of transcoding may comprise, but not be limited to, for example:
  a. Removing the stream from its transport container, decoding the video and/or audio back to an uncompressed state, then encoding (recompressing) the video and/or audio multiple times, once for each quality level the server needs to support various network delivery conditions. Since this transcoding is often to create the same content at more than one bit-rate, this step is sometimes called transrating, and
  b. Breaking the stream into multiple temporal fragments or segments to improve delivery options. Each stream might consist of a fragment for each period of time, such as 1 or 10 seconds, and each fragment might have one or more different versions for each bit-rate, to support multiple quality levels.

It should be noted that the operations in this stage takes significant time and computing resources to process and is often the costliest step in the streaming process. In addition, because the stages of transcoding and fragmentation often use a lossy compression, decompressing and recompressing the video and/or audio introduces compression artifacts and a reduction in quality. Embodiments of the present disclosure provide methods and systems to improve upon the disadvantages associated with the conventional methods and systems.

Method 100 may then proceed to stage 125, step 135, by storing each full stream or collection of fragments. The storage may comprise, but not be limited to, a persistent logical container (file) for each supported bit-rate, on server accessible storage. This is sometimes called network storage, or cloud storage.

Method 100 may then proceed to stage 125, step 140, by storing at least a portion of metadata such as the name, location, and number of files, and their related stream and supported bit-rate to a server accessible database (e.g., cloud-based storage in operative communication with the cloud server).

Method 100 may then proceed to stage 125, step 145, by processing a viewer request, from a client viewing device, for a specific stream. This includes, but is not limited to, for example, authenticating access to view the stream and using data (e.g., measured or provided metadata) about the viewer device's connection to elect the closest transcoded bit-rate.

Method 100 may then proceed to stage 125, step 150, wherein the server may retrieve the metadata from a server accessible database about transcoded files that can be streamed in response to the viewer device request.

Method 100 may then proceed to stage 125, step 155, wherein the server may retrieve part or all of a full stream file. In some embodiments, the server may repeatedly retrieve a fragment at a time, at the selected bit-rate, from storage to the server.

Having the content (either full stream or fragment), method 100 may then proceed to stage 125, step 160, wherein the server may send the transcoded content and metadata in response to the viewing device's request.

STAGE 165: Client Viewing (Destination) Device Operations

Method 100 may then proceed to stage 165, step 170, wherein the viewing device may receive the metadata and uses it to decode the received stream packets into video frames and/or audio samples for presentation at the appropriate time.

The conventional streaming architecture described above with reference to FIG. 1 was designed with a traditional client-server model. In this model, the server is used heavily for the centralized processing of information shared and consumed by the client devices. This general-purpose architecture has been useful and flexible during the formative years of streaming.

As streaming video and/or audio continues becoming a larger percentage of internet traffic, the inefficiencies of a general-purpose client-server model is leading to wasted computing resources, higher cost, and slower streaming performance for end-users. Embodiments of the present disclosure provide a modernized architecture to improve upon the problems presented by the conventional methods and systems.

III. Cloud Storage Direct Streaming

With the advent of client devices capable of more powerful processing, and the ubiquitous availability of automatically scaled cloud storage, a new streaming architecture is possible that better utilizes the available resources to reduce general-purpose processing on the server. This new design is referred to herein as "Cloud Storage Direct Streaming," although the name may not be limiting upon the various embodiments contemplated herein.

Embodiments of the Cloud Storage Direct Streaming may follow a similar content flow direction as the conventional streaming architecture: originating from a source device, to a cloud server, then to a destination viewing device. One of the differences, however, is that several units of work (i.e., method stages) performed on the Cloud Server in conventional stages, may now be performed on the client devices (e.g., either the client source device (streaming out) or the client destination device (viewing)), thereby eliminating most of the processing performed by the Cloud Server.

Figure 2:
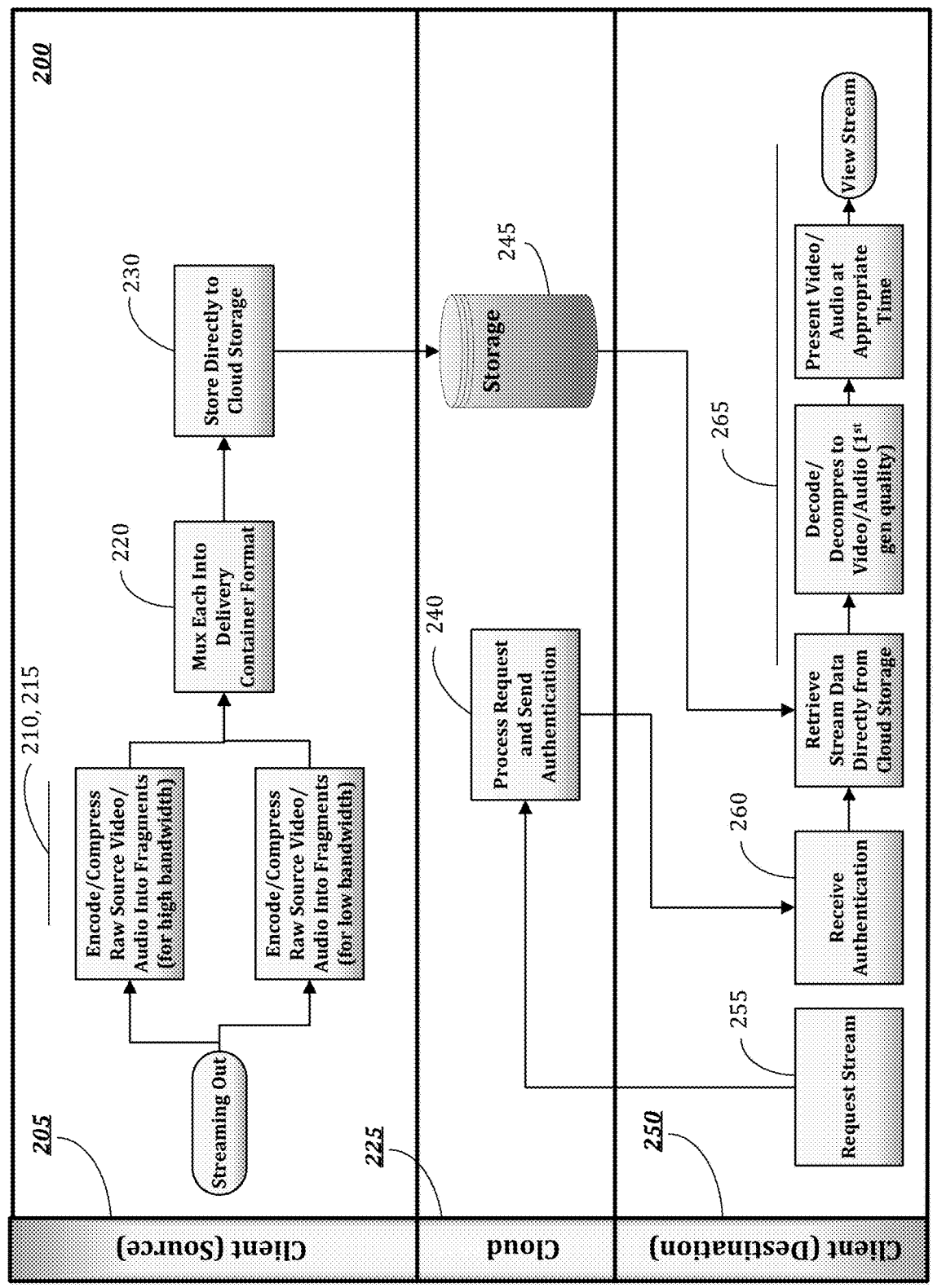
FIG. 2 is a flow chart depicting cloud storage direct streaming architecture.

FIG. 2 is a flow chart setting forth the general stages involved in a streaming architecture consistent with embodiments of the Cloud Storage Direct Streaming. The various stages disclosed with reference to FIG. 2 may be performed on a streaming source device, a server device, and a viewing device (each of which may be described as a computing device 600). Although method 200 has been described to be performed by specific computing elements (e.g., source device, server device, viewer device), it should be understood each of these computing elements may actually comprise a plurality of computing elements, either locally or remotely connected. As such, the computing elements described with reference to method 200 may be an abstraction for a plurality of operatively associated computing elements. For example, in some embodiments, operations may be disclosed to be performed by the client source device, the server, or the client viewing device; yet, in other embodiments, such operations may be performed by different networked elements in operative communication with those same elements.

Furthermore, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. The stages of a method 100 may comprise, but not be limited to, the following.

STAGE 205: Client Source (Origin) Device Operations

Method 200 may begin at stage 205, step 210, with source encoding. Source encoding may comprise, for example, encoding content into one or more compression formats of the video and/or audio source. The content may be captured, or received from a content capturing device, and provided to the client source device for streaming. In some embodiments, the capture of the content (e.g., recording a video/audio) may be performed by the same client source device, while in other embodiments, the capturing device may be in operative communication with the client source device.

As illustrated in FIG. 2, the content may be encoded into fragments simultaneously on the client source device. Although the disclosed embodiments illustrate two encoded fragment types, a plurality of varying fragment quantities is anticipated to be within the scope of the present disclosure. By way of non-limiting example, one of the compression formats may be encoded by the client source device at a high-quality bitrate (2.5 Mbps for example), while another may be encoded at a lower quality bitrate (400 Kbps for example). Further still, in various embodiments, video fragments may be encoded independently from audio fragments. In this way, and as will be apparent below, a client viewing device may request to switch from high quality to low quality over a period of time (e.g., every 1 to 3 seconds), while the audio source can be replaced during each interval.

Still consistent with embodiments of the present disclosure, client source device may be configured to encode the content as fragments. In some embodiments, the encoding of the content into fragments may be performed as the content is received from, for example, a capturing device or other source. The content fragments may be limited to a duration of, by way of non-limiting example, 1 to 3 seconds each. In this way, client source device may break the content into multiple temporal fragments or segments to improve delivery options to a client viewing device.

Figure 3:
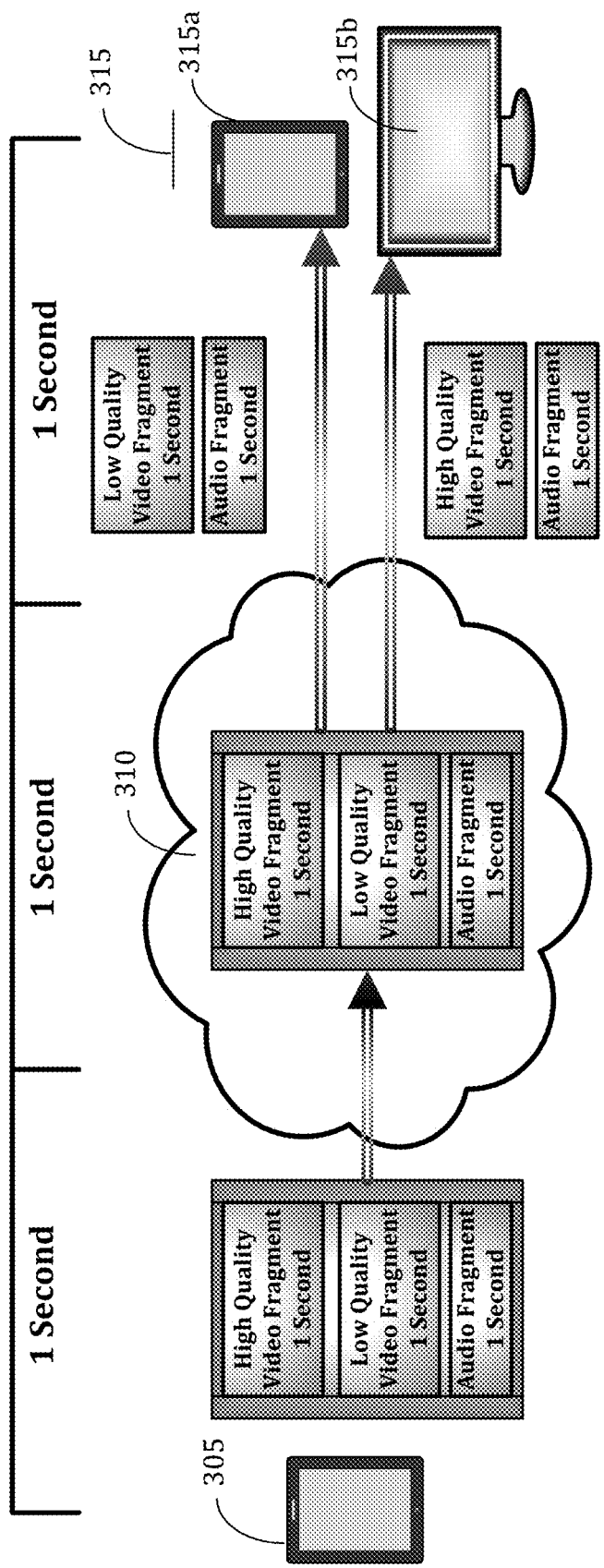
FIG. 3 illustrates independent video and audio fragmentation.

Referring now to FIG. 3, fragmenting may further provide added benefits to the viewing experience by enabling client viewing devices 315 to, for example: a) switch between quality levels without having to interrupt or rebuffer the stream, and importantly b) insert and return from other content, such as advertising without having to interrupt or rebuffer the stream. Conventional systems may provide for a delay in the viewing experience during content insertion and return. For example, YouTube™ delays a content stream after an advertisement playback is completed. This is due to the streaming architecture used which interrupts one stream with another to insert ad content. Embodiments of the present disclosure improve upon such content insertion and return by enabling the client viewing device to seamlessly mix and match fragments from various content storage locations, and playback the fragments as a consistent stream without interruption. The technical reason for this improvement is the player software on the viewing device, supporting the architecture of the present disclosure, seamlessly stitches together content fragments every one or more seconds. This enables an insert at the beginning of every fragment that is stitched on the viewing device and viewed as a single uninterrupted content stream. Unlike conventional streaming, the architecture of the present disclosure does not need to interrupt, and therefore does not need to rebuffer, the existing stream even though content can be inserted on either the cloud server or on the viewing device.

Further still, the fragments may be formatted (mux) into a transport container format on the origin device. The container format may be, for example, in an MP4 format. Thus, unlike conventional systems, in various embodiments of the present disclosure, the stages of encoding and fragmentation may be performed by the client source device, prior to communicating the encoded fragments to a cloud storage.

Method 200 may then proceed to stage 205, step 215, wherein the source device may generate metadata to describe the encoded fragments. Metadata may comprise, but not be limited to, for example, a name, duration, size, bit-rate, encoding, creation time, location, and presentation time of video frame and/or audio sample associated with one or more fragments. In various embodiments, the metadata creation may require information produced while the fragment is encoded. So, while the metadata storage and transport may be independent of the container or the fragment, the metadata creation stage may be performed after (or at the end of) the encoding of each fragment. It should be understood that portions of this stage may be performed either before, contemporaneously, or after the containment of the fragmented content.

Method 200 may then proceed to stage 205, step 220, by transporting the encoded fragments and metadata from the origin device to a cloud storage medium. For example, the client source device may be configured to stream the fragments to a cloud server having, or being associated with, cloud storage media. Consistent with embodiments of the present disclosure, each fragment may be written into cloud storage directly as soon as the fragment is available (i.e., after it has been encoded).

In conventional systems, streaming MPEG2-TS container is often used to "stream" the content to the cloud server. In some of these conventional scenarios, as part of the ingest/transcoding processing, the container is converted to an MP4 (ISO-BMFF) container because that container is ubiquitously supported by almost all players/viewer platforms. In accordance with embodiments of the present disclosure, client source device already produces the fragment in the MP4 (ISO-BMFF) container. Then, the client source device may, in some embodiments, simply upload the MP4 container of each fragment to cloud storage. In turn, when the client viewer device desires to play the stream, the MP4 may be downloaded to the viewing device where it is decoded and displayed. In this way, movements of the present disclosure may make streaming delivery simpler and more resilient than conventional streaming delivery protocols.

Still consistent with embodiments of the present disclosure, client source device may establish a real-time messaging system with the server. One example of a real-time messaging system may be SignalR™. A real-time messaging system may enable a direct channel of communication between the client device, a playback software operating on the client device, and the server. In this way, when a client viewing device is connected to the server for live content streaming, the client device may receive updates through the real-time message system with updated metadata. The message may comprise, but not be limited to, data for receiving and playing back the fragments (e.g., the identify and location of the latest encoded fragments) and may be associated with a plurality of compression formats. As such, and as will be detailed below, the client viewing device need not request metadata from the server and have readily available the necessary information to retrieve a fragment of a desired compression type from the cloud storage, without requiring any further processing from the client source device or the server.

Furthermore, the metadata associated with the content stream and each fragment may also be written to cloud storage and updated with each fragment. For example, in some embodiments, the metadata may be communicated to a server in a cloud table storage. Here, the metadata may be retrieved by client viewing devices that request the content on-demand, after, for example, the live streaming of the content has already occurred (or, for example, where the viewing device is lagging behind the live stream).

STAGE 225: Cloud Server Operations

Method 200 may then proceed to stage 225, step 230, wherein a cloud-based server may receive the content stream from the source device. Unlike conventional systems, the stage of transcoding the received content, and fragmenting the transcoded content for delivery, is no longer necessary, as the received content has already been encoded and fragmented by the source device. Moreover, the generation and provision of metadata associated with the encoded and fragmented content may not be necessary either, as the metadata is generated and provided by the client source device through a real-time messaging protocol facilitated by the server. As such, the operations in this stage take significantly less time and computing resources.

Method 200 may then proceed to stage 225, step 235, by storing each full stream or collection of fragments. The storage may comprise, but not be limited to, a persistent logical container (file) for each supported bit-rate, on server accessible storage. Unlike conventional systems, for live streaming scenarios, the server may not need to store the metadata associated with the stored content. Rather, as mentioned above, a real-time messaging protocol may be established and facilitated by the server between one or more client source devices and one or more client viewing devices. In this way, the metadata associated with the stored content may be generated by the source device and transmitted directly to the client device using the real-time messaging protocol.

Accordingly, a client viewing device with permission to receive the content may receive the instructions for obtaining the content (i.e., metadata associated with the content), directly from the client source device, in near real-time as the corresponding content fragments are generated by the client source device. The client viewing device may then read the metadata and access a desired content fragment directly from cloud storage where it is sent by the client source device and stored for streaming to a plurality of client viewing devices. In this way, the server need not expend resources on receiving, processing, and transmitting metadata requests from the client device, but rather serves as an intermediary in the real-time messaging protocol, connecting a client source device with a client viewing device. Such configuration may enable the client viewing device to receive, from the client source device, the necessary information it may need to retrieve the appropriate content fragment from cloud storage.

For example, in a SignalR™ or similar implementation, the server component may serve as a hub between the client viewing device (receiving the metadata) and the client source device (generating the metadata). In this instance, and in some embodiments, the real-time messaging protocol may enable clients source devices to push messages to the server (i.e., generated metadata regarding encoded fragments), and allows the server to push messages to one or more registered client viewing device. This may be performed through, for example, the use of an open connection maintained between the clients and the server (i.e., hub).

Further still, in some embodiments, the server may maintain a list of registered clients and keep track of the open connection to each client, in order to push messages to the clients without the need for the client to poll the server for new data. This design pattern for real-time communication may be referred to a publish-subscribe (or pub-sub) and is more efficient than the older polling model.

Method 200 may then proceed to stage 225, step 240, by processing a viewer request, from a client viewing device, for a specific content. Unlike in conventional systems, the server may not be required to, for example, ascertain metrics regarding the viewer device's connection to elect the closest transcoded bit-rate. Rather, through the facilitation of the real-time messaging protocol, the client device merely requests authentication and may then make its own determination as to what content fragment compression type to retrieve from cloud storage.

Consistent with embodiments of the present disclosure, authentication may be the process in which the client viewing device requests to receive the location of and access to the metadata, such that it may have the necessary information it needs to begin streaming the content. Parameters for authentication may include, but not be limited to, for example, "Is this viewer signed into a valid account?" or, "Does this viewer account have access to this premium channel or sporting event?" or, "Is billing for this viewer account in good standing or past due?"

Method 200 may then proceed to stage 225, step 245, wherein the server may transmit the content to the viewing device. Transmission may be in response to the client viewing device's request for one or more fragments, at a particular bitrate, from a particular storage location associated with the content. In some embodiments, a request from the client viewing device need not be received prior to transmission to the client device.

Consistent with embodiments of the present disclosure, a viewing device may (a.k.a. requests messages/updates) for a particular piece of live content through, for example, a real-time messaging protocol with a client source device. The messages, via the protocol, may provide metadata coming in for every fragment, once the fragment is available on cloud storage. These messages may continue until the viewing device unregisters (requests no further messages) for the piece of content (e.g., when the user no longer wants to watch that live content). In this way, the viewing device will constantly have the latest information as to the location of each fragment to retrieve for the desired playback experience.

STAGE 250: Client Viewing (Destination) Device Operations

Method 200 may then proceed to stage 250, step 255, wherein the viewing device may request to receive a content stream from the server. The request for the content stream may be a request for live streaming content, or a request for on-demand content. The stages for retrieving the metadata, in each stage, may be different. For example, and as detailed above, live streaming content metadata may be communicated to the client device through a real-time messaging protocol, whereas on-demand content metadata may be communicated to the client device through metadata stored in association with the content on the cloud storage medium.

Method 200 may then proceed to stage 250, step 260, wherein the client viewing device may be authenticated. In some embodiments, both the request to receive the content, and the authentication, may be provided by another computing element associated with the source and cloud storage. For example, authentication may be provided from a separate server running business rules or business logic that validates an account associated with the client viewing device, channel access for that account, billing standing, etc.

Accordingly, the server may only serve to receive, store, and transmit the content to those client viewing devices or associated accounts that have been authenticated. Once authenticated, the client device may establish a connection to receive metadata. The metadata communication system and method may depend on the content type (e.g., on demand/live).

Having the metadata, method 200 may then proceed to stage 250, step 265, and retrieve desired content type (i.e., a bitrate quality level, sometimes referred to herein as a compression format, compression type, or compression size) from its storage location. FIG. 3 illustrates an embodiment of video and audio fragment communication. Client source device 305 may encode content into, for example, at least one video compression format and at least one audio compression size. In some embodiments, the client source device may encode video and audio together into one or more fragments per temporal period, and/or separately into separate video and audio fragments. The encoded content may be transmitted to cloud storage 310 where it may be stored pending delivery to a client viewing device. Once client viewing devices 315 is authenticated and receives information (e.g., metadata) regarding the stored content, client viewing devices 315 may retrieve the desired content from cloud storage 310.

Still consistent with embodiments of the present disclosure, a first client device 315a may desire to retrieve a different compression size than a second client device 315b. Because the fragments may be assembled by, for example, software on the client viewing device, video quality can change dynamically from one bitrate to another as requested from the client based on network connectivity conditions, and the audio source can be switched on the fly. This means the device encoded audio could be replaced with a professional audio source from a different device source, like the mixing board at a concert or the commentators at a sporting event.

By way of non-limiting example, a client viewing device may comprise a content player and may perform the following operations to receive live streaming content: 1) register with a cloud real-time message hub in the cloud; 2) received real-time messages from cloud real-time message hub with metadata about each new fragment shortly after they are created and uploaded; 3) use that metadata to download the fragment from cloud storage in whichever bitrate the player requires; 4) decode and display the fragment; and 5) repeat the operations for subsequent fragments.

Again, by way of non-limiting example, a client viewing device may comprise a content player and perform the following operations to receive on-demand content: 1) download a list of metadata for all fragments from cloud table storage; 2) download, for each row in the metadata list, the fragment in whichever bitrate the player requires; 3) decode and display the fragment; and 4) repeat the operations for subsequent fragments.

IV. Improvements Upon Conventional Methods and Systems

A. Peer-to-Peer

Another departure from the traditional client-server model is a peer-to-peer (P2P) architecture. With P2P all processing work is distributed across a network of clients, communicating directly, and forming a mesh processing network to share units of work for other clients on the network. Even though processing work with Cloud Storage Direct Streaming is being performed on the client devices, the work performed on the client is only for that client's stream, not shared work for other clients. Although, in some embodiments, aspects of the present disclosure may be incorporated into a Peer-to-Peer system.

B. WebRTC

Another application specific streaming architecture is WebRTC, which uses real-time messaging to deliver every frame to the view as it is encoded. This approach has extremely low latency usable for video conferencing at the cost of lesser visual quality and/or higher bandwidth usage. Unfortunately, it increases the workload on the cloud server since a much smaller collection of samples, sometimes each frame at a time is encoded, then sent by the server to each viewing device. In some embodiments, aspects of the present disclosure may be incorporated into a WebRTC system.

C. Serverless Streaming

A new cloud software deployment strategy gaining popularity is called Serverless Computing. Examples of this include Microsoft Azure Functions and Amazon AWS Lambda. Serverless is often referred to as an architecture but it is more accurately a container and deployment strategy that enables the same functional software to be deployed at a higher level with no knowledge or administration of specific servers. The same code is still executed and the processing paid for but server management is handled by the cloud service provider. Serverless is a misnomer in that regard. Unlike Serverless, Cloud Storage Direct Streaming actually removes entire servers from the incoming and outgoing streaming process. Although, in some embodiments, aspects of the present disclosure may be incorporated into a serverless system.

V. Example Embodiments

It should be understood that the following are illustrative, example embodiments only. Other embodiments are anticipated to be within the scope of the present disclosure. Moreover, each embodiment with the Cloud Storage Direct Streaming architecture may require some custom software on the client devices to perform the Units of Work (i.e., method stages) that were shifted from the Server. This includes the stream encoding and formatting on the source client device, and reassembly of the stream fragments on the destination client viewing device.

A. Mobile Source Embodiment

Figure 4A:
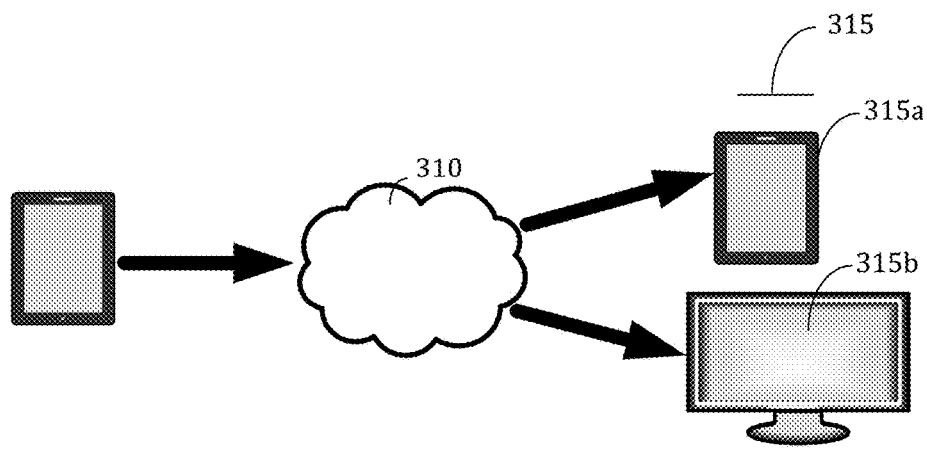
FIGS. 4A-4C illustrate example embodiments.

FIG. 4A illustrates one embodiment of Cloud Storage Direct Streaming using a smart mobile device such as a phone, tablet, wearable, or drone as the Client Source to stream out. This embodiment uses a combination of the CPU, and GPU acceleration if available, built into the mobile device (an Apple iPhone for example) to encode Video and/or Audio at multiple bitrates at the same time, and write fragments directly to Cloud Storage.

B. Pro Encoder Source Embodiment

Figure 4B:
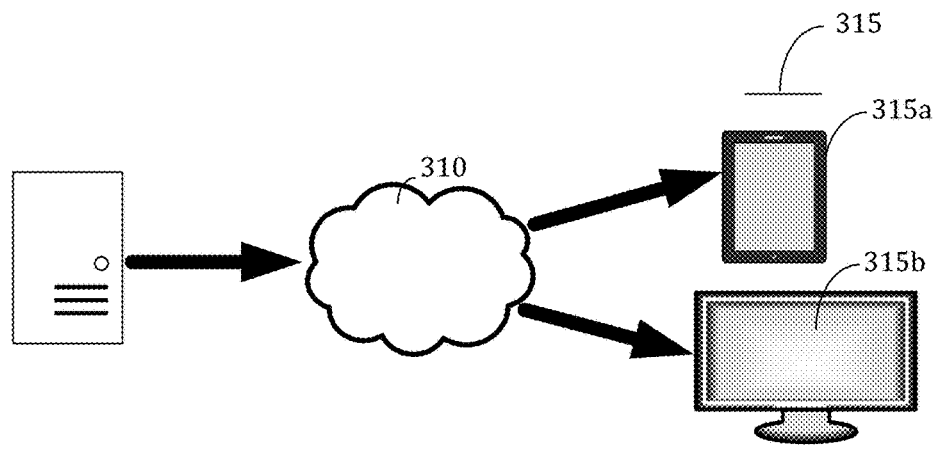

FIG. 4B illustrates another embodiment of Cloud Storage Direct Streaming using a general-purpose computing device such as a PC that can be rack mounted as part of a professional equipment installation at a concert, conference, or sports event for example. The PC would include a video and/or audio input from professional capture devices or switcher/mixer equipment. The input would be encoded into, for example, two video bitrate quality levels as fragments, with audio fragments similar to the Mobile Source example. The fragments would be written direct to Cloud Storage as is done with the Mobile Source example, and the rest of the streaming architecture from Viewing devices is the same.

C. Pro Encoder Source Embodiment

Figure 4C:
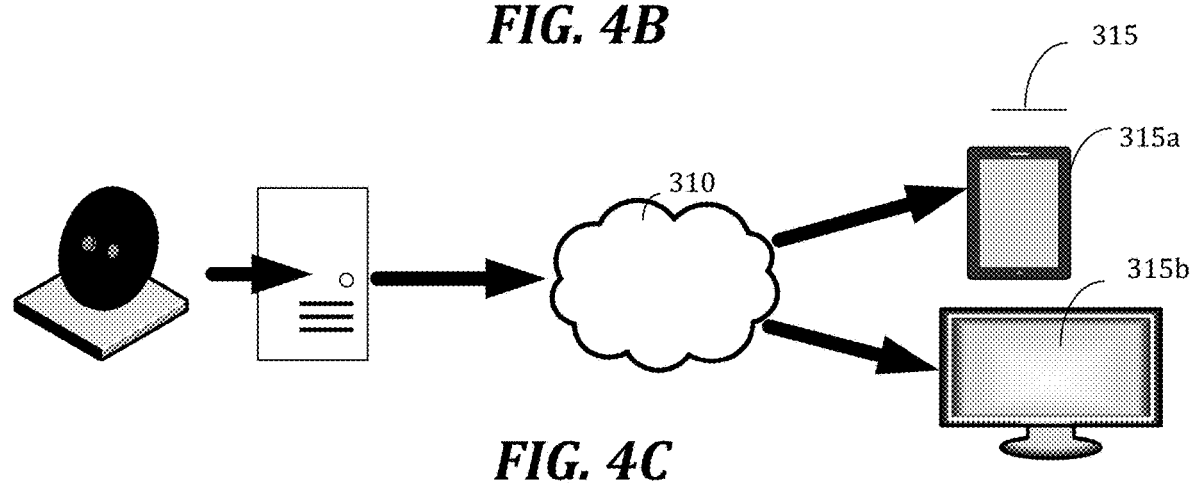

FIG. 4C illustrates another embodiment of Cloud Storage Direct Streaming. Like the Pro Encoder Source example, this embodiment can use a similar PC device as a professional encoder installed at master facility such as a Television Downlink or Cable Head End where the content, such as a television program, can be routed into the Pro Encoder device to convert into a fragmented stream. One example of this would be to simulcast a news program on the air, via cable, and via live or on-demand streaming.

VI. Cost Saving Advantages

The disclosure in this section should not be construed to imply any single feature or function of the embodiments disclosed herein. Rather, this section is disclosed to illustrate potential cost savings that may be realized with certain implementations, but not with other implementations.

While lower latency, better video quality, and swappable audio sources are important for user retention, the largest immediately measurable gain from Cloud Storage Direct Streaming is the operating cost savings. A conservative estimate of 50-60% less cloud resources are required to deliver streams with this architecture, with the added benefit of higher content quality, and lesser end to end (E2E) latency.

Two of the largest line items in the operating costs of a streaming service are servers and bandwidth. The servers are usually dedicated to transcoding/transrating for incoming stream processing, and authentication and streaming servers for outgoing (viewed) streams.

There are two common ways to pay for cloud server related costs. The first way is a dedicated server fee, and the second is a virtualized server with pay-for-usage model. The virtualize server model has many variables and can be more difficult to estimate for operating costs, and the dedicated server pricing model for discussing cost savings may be used.

With the first pricing option, a common price for a transcoding server is roughly $2,000 to $3,000 per month and can usually handle 16 or less simultaneous streams. For a scaling streaming service, that cost adds up quickly. Scaling out to support 1,000 simultaneous incoming streams would take a minimum of 63 servers, at a cost of roughly $126,000 to $189,000 per month.

In addition to a transcoding server for incoming streams, a separate server is usually used to stream out to viewers. This includes reading files from cloud storage and packetizing the stream independently for each viewing device. Similar pricing options exist for the stream out server, as with the transcoding server. Because transcoding generates more processing work, more simultaneous outgoing streams are supported per-server than incoming streams. Each stream out server should support roughly 100 to 1,000 simultaneous viewers, for the same price range of $2,000 to $3,000 per month. Continuing with our example above, scaling out to support 1,000 simultaneous outcoming streams would have an estimated cost of $2,000 to $30,000 per month.

With the Cloud Storage Direct Streaming architecture there is no longer a need for a transcoding server, and no need to packetize the stream on a dedicated stream out server. The only cloud resource required is cloud storage (Microsoft Azure Blob or Amazon AWS S3, for example) and an optional authentication API for the viewer.

Figure 5:
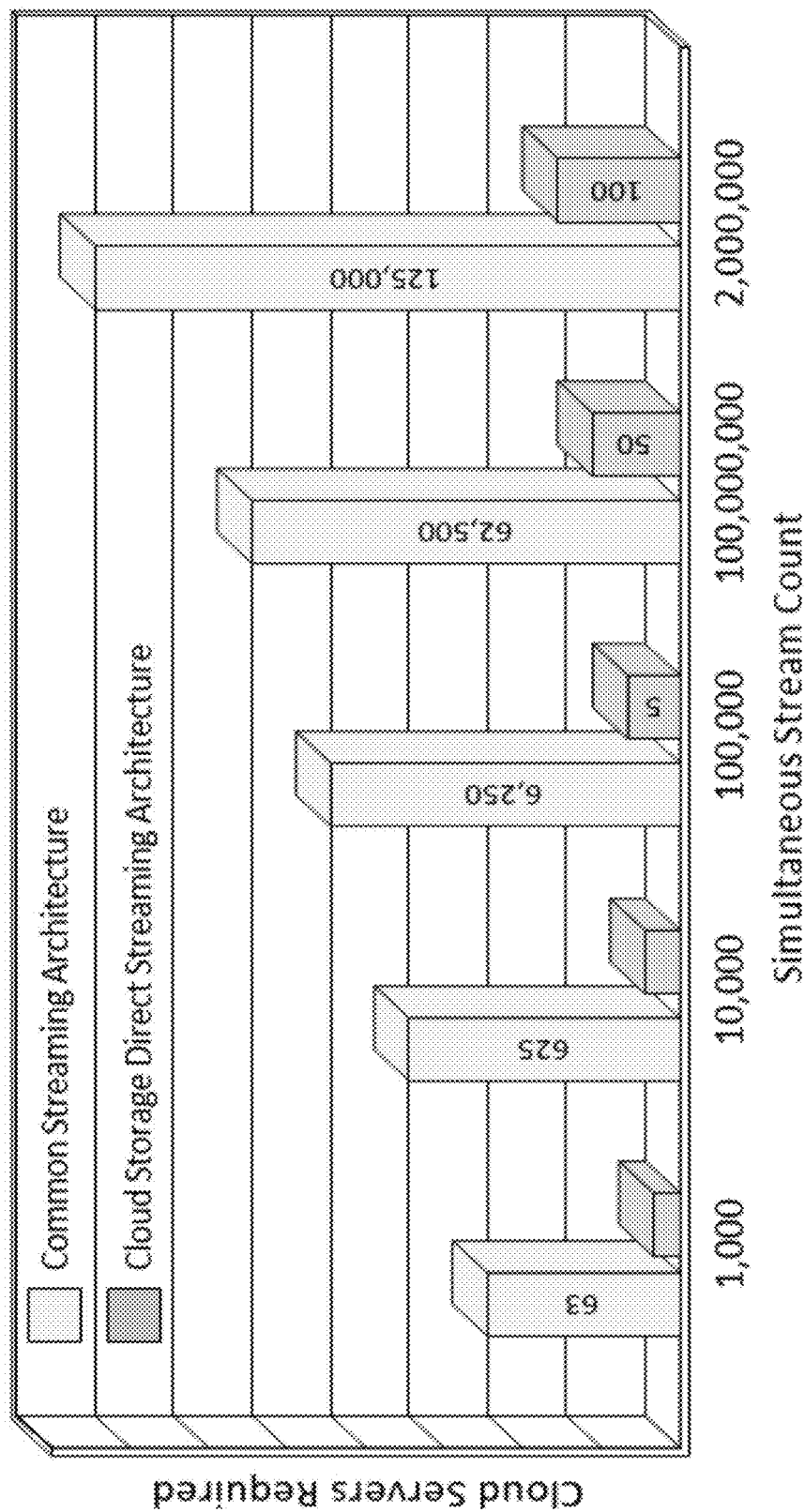
FIG. 5 illustrates a computational example of cost savings.

FIG. 5 illustrates a complete example of cost savings for a streaming provider delivering 10,000 live or simultaneous streams to 500,000 viewers. Using the Common Streaming Architecture, it would require a minimum of 625 incoming stream servers, and 500 to 5,000 stream-out servers. The combined cost of those servers ranges from $2,250,000 to $16,875,000 per month. With the Cloud Storage Direct Streaming architecture, all stream-in servers and almost all stream-out servers, and their associated costs, are eliminated.

With Cloud Storage Direct Streaming all transcoding server costs are eliminated, in some embodiments, all but simple authentication transactions for stream-out servers may be eliminated. This architecture and cost savings could be applied to mobile live-streaming providers, like Facebook, Periscope, Snapchat, or OTT Television streaming providers, such as Netflix, Hulu, HBO, and many other up-and-coming streaming categories like sports and concerts.

VII. Computing Device Architecture

Figure 6:
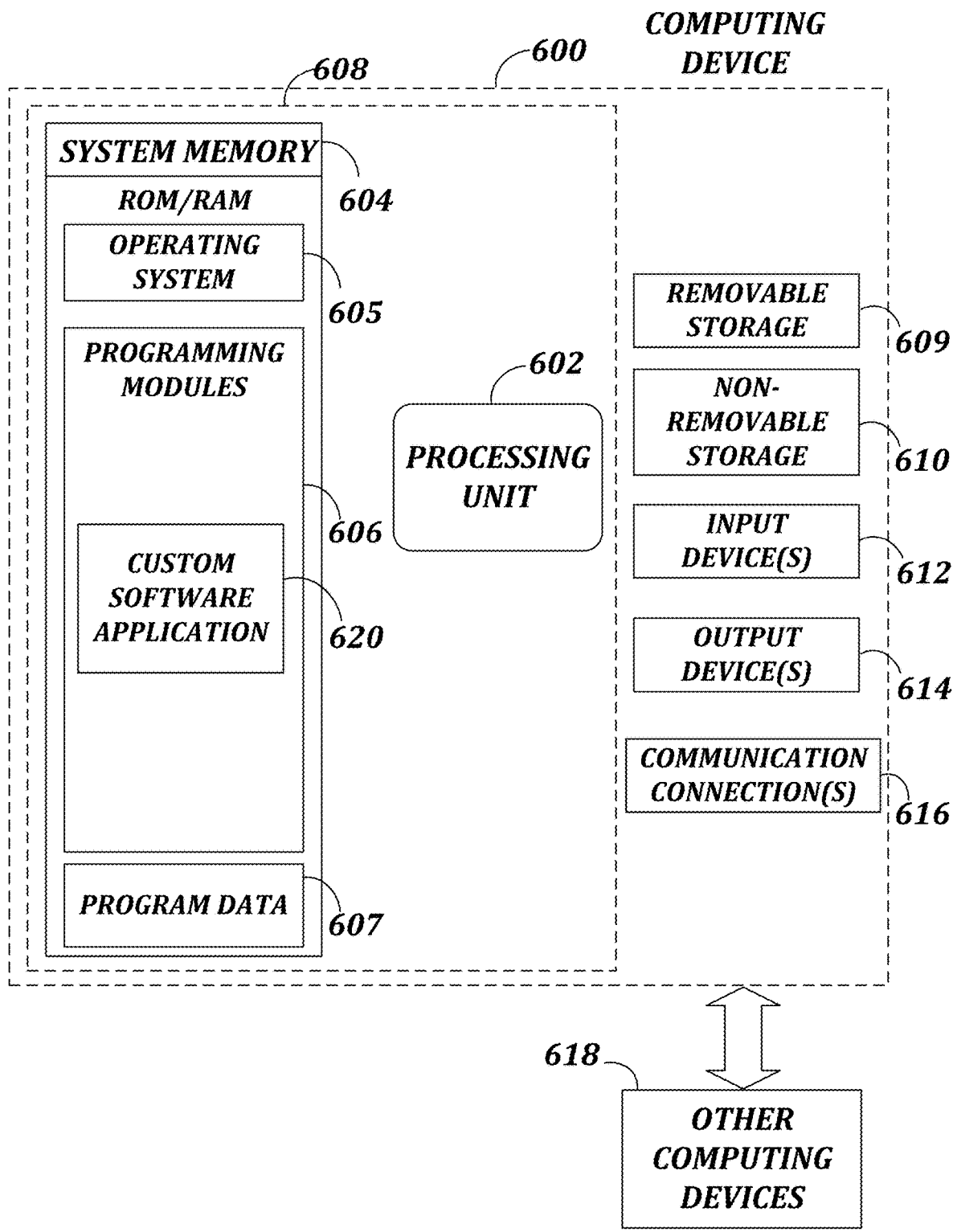
FIG. 6 is a block diagram of a system including a computing device for performing the methods consistent with embodiments of the present disclosure.

As mentioned throughout the disclosure, a computing device may be implemented as a source device, server device, and viewer device. FIG. 6 is a block diagram of a suitable computing device 600 for the aforementioned embodiments.

Consistent with an embodiment of the disclosure, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the disclosure.

With reference to FIG. 6, a system consistent with an embodiment of the disclosure may include a computing device, such as computing device 600. In a basic configuration, computing device 600 may include at least one processing unit 602 and a system memory 604. Depending on the configuration and type of computing device, system memory 604 may comprise, but is not limited to, volatile (e.g., random access memory (RAM)), non-volatile (e.g., read-only memory (ROM)), flash memory, or any combination. System memory 604 may include operating system 605, one or more programming modules 606, and may include a program data 607. Operating system 605, for example, may be suitable for controlling computing device 600's operation. In one embodiment, programming modules 606 may include customer software application 620 enabled to perform, for example, client-side fragmentation. Furthermore, embodiments of the disclosure may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 (e.g., customer software application 620) may perform processes including, for example, one or more of method stages as described above. The aforementioned process is an example, and processing unit 602 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and quantum computing elements. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

VIII. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A system comprising:
   at least one remote memory storage configured to:
      store a plurality of encoded fragments as:
         a first set of encoded fragments that is associated with a first quality parameter, and
         a second set of encoded fragments that is associated with a second quality parameter; and
   one or more processing units in communication with the at least one remote memory storage, wherein the one or more processing units are configured, in the aggregate, to:
      establish a real-time messaging channel between a viewing device and a source device, wherein the viewing device has at least one parameter, and wherein the viewing device is associated with at least one other viewing device having at least one other parameter;
      communicate metadata through the real-time messaging channel from the source device to the viewing device as the metadata is generated by the source device, wherein the metadata comprises information regarding the plurality of encoded fragments;
      determine a desired fragment, with a desired quality parameter, based on, at least in part, the at least one parameter associated with the viewing device;
      generate a request, based on, at least in part, the metadata transmitted through the real-time messaging channel, for a first encoded fragment in the first quality parameter;
      transmit the first encoded fragment from the at least one remote memory storage to the viewing device; and
      retrieve, by the viewing device, the first fragment in the first quality parameter, while providing the first fragment to the at least one other viewing device in the second quality parameter.

2. The system of claim 1, wherein the one or more processing units are further configured, in the aggregate, to:
   generate a request, based on, at least in part, the metadata transmitted through the real-time messaging channel, for a second encoded fragment in the second quality parameter; and
   transmit the second encoded fragment from the at least one remote memory storage to the viewing device.

3. The system of claim 1, wherein the metadata comprises at least one of the following: a name, a duration, a size, a resolution, a bit-rate, an encoding, a creation time, a location, and a presentation time of at least one of: a video frame and an audio sample.

4. The system of claim 1, wherein the one or more processing units are further configured, in the aggregate, to:
facilitate an authentication for access to the metadata; and
facilitate, upon the authentication, the real-time messaging channel between the source device and the viewing device.

5. A method comprising:
causing a remote memory storage to store a plurality of encoded fragments as:
a first set of encoded fragments that is associated with a first quality parameter, and
a second set of encoded fragments that is associated with a second quality parameter;
establishing a real-time messaging channel between a viewing device and a source device, wherein the viewing device has at least one parameter, and wherein the viewing device is associated with at least one other viewing device having at least one other parameter;
communicating metadata through the real-time messaging channel from the source device to the viewing device as the metadata is generated by the source device, wherein the metadata comprises information regarding the plurality of encoded fragments;
receiving a request for a first encoded fragment in the first quality parameter, the request being based on, at least in part, the metadata transmitted through the real-time messaging channel, wherein the request is determined based on, at least in part, the at least one parameter associated with the viewing device; and
transmitting the first encoded fragment from the remote memory storage to the viewing device, such that the viewing device retrieves the first fragment in the first quality parameter, while providing the first fragment to the at least one other viewing device in the second quality parameter.

6. The method of claim 5, further comprising:
receiving a request for a second encoded fragment in the second quality parameter, the request being based on, at least in part, the metadata transmitted through the real-time messaging channel; and
transmitting the second encoded fragment from the remote memory storage to the viewing device.

7. The method of claim 5, wherein the metadata comprises at least one of the following: a name, a duration, a size, a resolution, a hit-rate, an encoding, a creation time, a location, and a presentation time of at least one of: a video frame and an audio sample.

8. The method of claim 5, further comprising:
facilitating an authentication for access to the metadata; and
facilitating, upon the authentication, the real-time messaging channel between the source device and the viewing device.

9. One or more non-transitory computer readable media comprising instructions which, when executed by one or more hardware processors, cause performance of operations comprising:
storing, at a remote storage device, a plurality of encoded fragments as:
a first set of encoded fragments that is associated with a first quality parameter, and
a second set of encoded fragments that is associated with a second quality parameter;
establishing a real-time messaging channel between a viewing device and a source device, wherein the viewing device has at least one parameter, and wherein the viewing device is associated with at least one other viewing device having at least one other parameter;
communicating metadata through the real-time messaging channel from the source device to the viewing device as the metadata is generated by the source device, wherein the metadata comprises information regarding the plurality of encoded fragments;
determining a desired fragment, with a desired quality parameter, based on, at least in part, the at least one parameter associated with the viewing device;
generating a request, based on, at least in part, the metadata transmitted through the real-time messaging channel, for a first encoded fragment in the first quality parameter;
transmitting the first encoded fragment from the remote storage device to the viewing device; and
retrieving, by the viewing device, the first fragment in the first quality parameter, while providing the first fragment to the at least one other viewing device in the second quality parameter.

10. The non-transitory computer readable media of claim 9, wherein the operations further comprise:
generating a request, based on, at least in part, the metadata transmitted through the real-time messaging channel, for a second encoded fragment in the second quality parameter; and
transmitting the second encoded fragment from the remote storage device to the viewing device.

11. The non-transitory computer readable media of claim 9, wherein the metadata comprises at least one of the following: a name, a duration, a size, a resolution, a bit-rate, an encoding, a creation time, a location, and a presentation time of at least one of: a video frame and an audio sample.

12. The non-transitory computer readable media of claim 9, wherein the operations further comprise:
facilitating an authentication for access to the metadata; and
facilitating, upon the authentication, the real-time messaging channel between the source device and the viewing device.

* * * * *